(12) United States Patent
Garcia et al.

(10) Patent No.: US 8,667,267 B1
(45) Date of Patent: Mar. 4, 2014

(54) SYSTEM AND METHOD FOR COMMUNICATING WITH A KEY MANAGEMENT SYSTEM

(75) Inventors: Eduardo Garcia, Austin, TX (US); Carlos Arturo Colorado, Municipio de Zapopan (MX)

(73) Assignee: Gazzang, Inc., Austin, TX (US)

( * ) Notice: Subject to any disclaimer, the term of this patent is extended or adjusted under 35 U.S.C. 154(b) by 0 days.

(21) Appl. No.: 13/362,695

(22) Filed: Jan. 31, 2012

Related U.S. Application Data

(60) Provisional application No. 61/438,192, filed on Jan. 31, 2011, provisional application No. 61/438,188, filed on Jan. 31, 2011, provisional application No. 61/438,196, filed on Jan. 31, 2011.

(51) Int. Cl.
*H04L 29/06* (2006.01)

(52) U.S. Cl.
USPC .......... 713/153; 380/202; 709/229; 713/168; 713/170; 713/171; 726/17

(58) Field of Classification Search
None
See application file for complete search history.

(56) References Cited

U.S. PATENT DOCUMENTS

| | | | |
|---|---|---|---|
| 6,678,828 B1 | 1/2004 | Pham et al. | |
| 6,931,530 B2 | 8/2005 | Pham et al. | |
| 7,143,288 B2 | 11/2006 | Pham et al. | |
| 8,024,560 B1* | 9/2011 | Alten | 713/156 |
| 8,306,919 B2* | 11/2012 | Sakamura et al. | 705/64 |
| 2002/0073322 A1* | 6/2002 | Park et al. | 713/188 |
| 2006/0050877 A1* | 3/2006 | Nakamura | 380/46 |
| 2006/0143453 A1* | 6/2006 | Imamoto et al. | 713/169 |
| 2007/0180255 A1* | 8/2007 | Hanada et al. | 713/176 |
| 2009/0259838 A1* | 10/2009 | Lin | 713/150 |
| 2010/0008509 A1* | 1/2010 | Matsushita et al. | 380/279 |
| 2010/0296652 A1* | 11/2010 | Nakayama et al. | 380/201 |
| 2010/0325713 A1* | 12/2010 | Kurita et al. | 726/7 |
| 2011/0078549 A1* | 3/2011 | Thueringer et al. | 714/807 |
| 2011/0276495 A1* | 11/2011 | Varadarajan et al. | 705/71 |
| 2011/0302417 A1* | 12/2011 | Whillock et al. | 713/168 |
| 2012/0036357 A1* | 2/2012 | Struik | 713/166 |
| 2012/0130874 A1* | 5/2012 | Mane et al. | 705/34 |
| 2012/0131341 A1* | 5/2012 | Mane et al. | 713/168 |

OTHER PUBLICATIONS

Koe et al., "A Study on the Encryption Algorithm for RFID tag (SEED: 8 Rounds X 64 bit block," IEEE, 2008, pp. 672-677.*
Kim et al., "Design and Implementation of a Private and Public Key Crypto Processor and Its Application to a Security System," IEEE, Feb. 2004, vol. 50 Issue: 1, pp. 214-224.*
Du et al., "A Pairwise Key Predistribution Scheme for Wireless Sensor Networks," ACM, May 2005, vol. 8 Issue 2, pp. 228-258.*
Cheng, "Security Attack Safe Modle and Cloud-Based One-Time Password Tokens Using Rubbing Encryption Algorithm," ACM, Jun. 2011, pp. 304-336.*

* cited by examiner

*Primary Examiner* — Luu Pham
*Assistant Examiner* — Demaris Brown
(74) *Attorney, Agent, or Firm* — Sprinkle IP Law Group

(57) ABSTRACT

A method for providing authenticated access to an encrypted file system includes generating a first seed; providing a request for a key to a key server, the request including at least a first seed block having a first encryption, a message block having a second encryption, and an encryption encapsulation block having a third encryption, the encryption encapsulation block including information for decrypting the message block; at the key server, decrypting the encryption encapsulation block and using the information therein to decrypt the at least a first seed block and the message block; and authenticating the message if the first seed in the at least a first seed block matches a first predetermined seed.

21 Claims, 8 Drawing Sheets

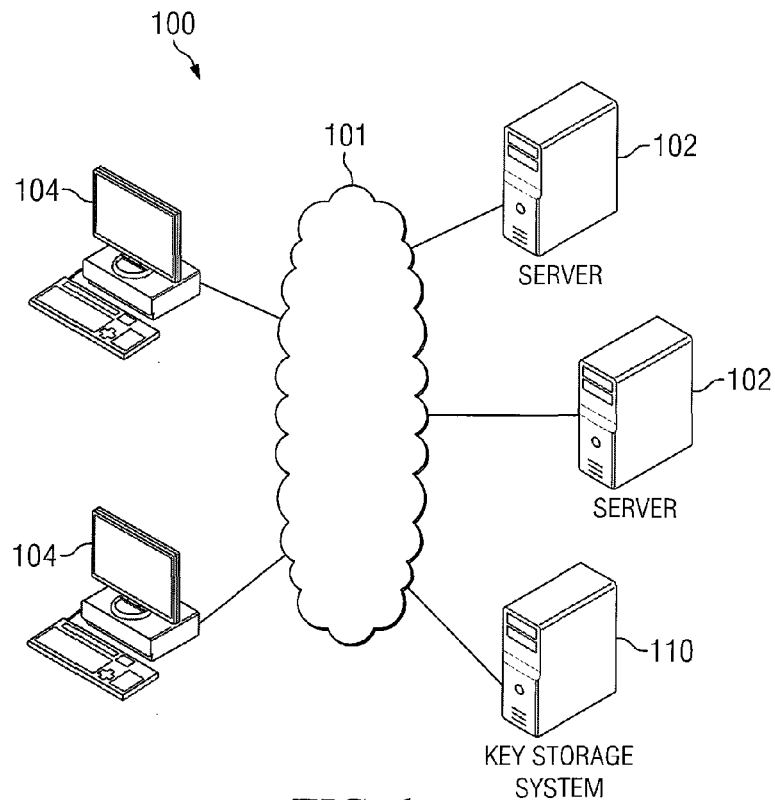
FIG. 1
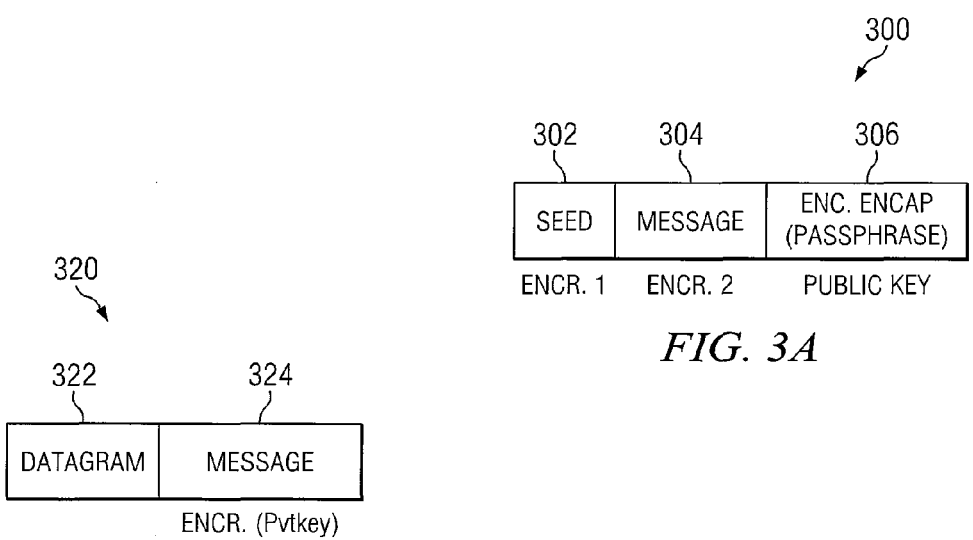
FIG. 3A
FIG. 3B

SYSTEM AND METHOD FOR COMMUNICATING WITH A KEY MANAGEMENT SYSTEM

CROSS REFERENCE TO RELATED APPLICATIONS

This application is related to and claims priority from U.S. Provisional Application Ser. No. 61/438,192, filed Jan. 31, 2011, entitled "System and Method for Communicating with a Key Management System;" U.S. Provisional Application Ser. No. 61/438,188, filed Jan. 31, 2011, entitled "System and Method for Providing Authenticated Access to an Encrypted File System by a MySQL Process;" and U.S. Provisional Application Ser. No. 61/438,196, filed Jan. 31, 2011, entitled "System and Method for Controlling Access to Encrypted Data," all of which are incorporated by reference in their entireties as if fully set forth herein.

FIELD OF THE INVENTION

The present disclosure relates to encrypted file systems and, particularly, to systems and methods for communicating with a key management system.

BACKGROUND OF THE INVENTION

Encrypted file systems allow applications to store encrypted files in non-volatile storage, such as hard drives. Encrypted file systems are typically implemented as a stack of layers with an encryption layer on top of a mounted file system. eCrtypfs, for example, is a kernel-native stacked cryptographic file system included with many Linux distributions that layers on top of lower level file systems including Linux ext 2/3/4, NFS, CIFS, XFS, ReiserFS, JFS, FAT 32, and can be extended to other file systems. eCrypffs provides a virtual file system seen by applications so that file operations go through eCrypffs. eCryptfs uses keys stored in a kernel layer key ring to encrypt and decrypt files.

Many encrypted file systems were designed on the assumption that they would operate on a single machine and therefore files would be available to all processes on a machine (assuming the user logged in had the appropriate credentials). In a networked environment, such file systems do not provide adequate security for data because any process can access the encrypted files so long as the encrypted file system key ring contains the correct key. This problem becomes more pronounced in a cloud environment. In a cloud, processes running on the same hardware may be controlled by different entities that should not access each other's data. Furthermore, the cloud environment hardware may be administered by a different set of administrators than the virtual environment provided in the cloud. Consequently, it may be undesirable for some process or administrators who have physical access to the servers and credentials to access the operating system to access the encrypted data on the servers.

In addition to the inability to properly protect data from network users and administrators, another problem faced in cloud computing and other networked computer environments is properly managing encryption keys between distributed computers. In particular, it is undesirable to store keys in non-volatile memory on a cloud server, so the keys must be stored at another location and accessed over a network. For public networks, the keys must be kept safe during transmission between the key storage and cloud server. The key management system must ensure it is not distributing keys improperly.

SUMMARY OF THE INVENTION

These and other drawbacks in the prior art are overcome in large part by systems and methods as disclosed herein. A system and method for secure key management provides authentication data with every communication, which can be signed with a set of keys and encrypted with a passphrase generated at a service provider. Advantageously, the authenticity of the information source, as well as the integrity of the information, are checked. Information sent from a server to a client is maintained secret and untouched by third parties.

A method for providing authenticated access to an encrypted file system includes generating a first seed; providing a request for a key to a key server, the request including at least a first seed block having a first encryption, a message block having a second encryption, and an encryption encapsulation block having a third encryption, the encryption encapsulation block including information for decrypting the message block; at the key server, decrypting the encryption encapsulation block and using the information therein to decrypt the at least a first seed block and the message block; and authenticating the message if the first seed in the at least a first seed block matches a first predetermined seed.

In some embodiments, the request may include a second seed, and using the second seed to authenticate the message if the first seed does not match the predetermined seed. In some embodiments, the message block further includes a message hash, wherein the message is authenticated if the first seed matches a first predetermined seed and the message hatch matches a newly generated message hash. In some embodiments, the first encryption and the second encryption are a single use passphrase. In some embodiments, the third encryption is a public key encryption.

A system in accordance with embodiments of the invention may include a network; at least one servers operably coupled to the network, the at least one server including one or more encrypted file systems; and a key storage system operably coupled to the network, the key storage system configured to store decryption information for decrypting data stored in the one or more encrypted file systems In some embodiments, the system includes at least one key ring operably coupled to the one or more encrypted file systems, the key ring storing information received from the key storage system associated with encryption keys. In some embodiments, the information is received responsive to a secure request.

BRIEF DESCRIPTION OF THE DRAWINGS

FIG. 1 is a block diagram of a network system in accordance with exemplary embodiments.

FIG. 3A, FIG. 3B, and FIG. 3C are diagrams illustrating exemplary encryption related messages in accordance with exemplary embodiments.

DETAILED DESCRIPTION OF EMBODIMENTS

Figure 2:
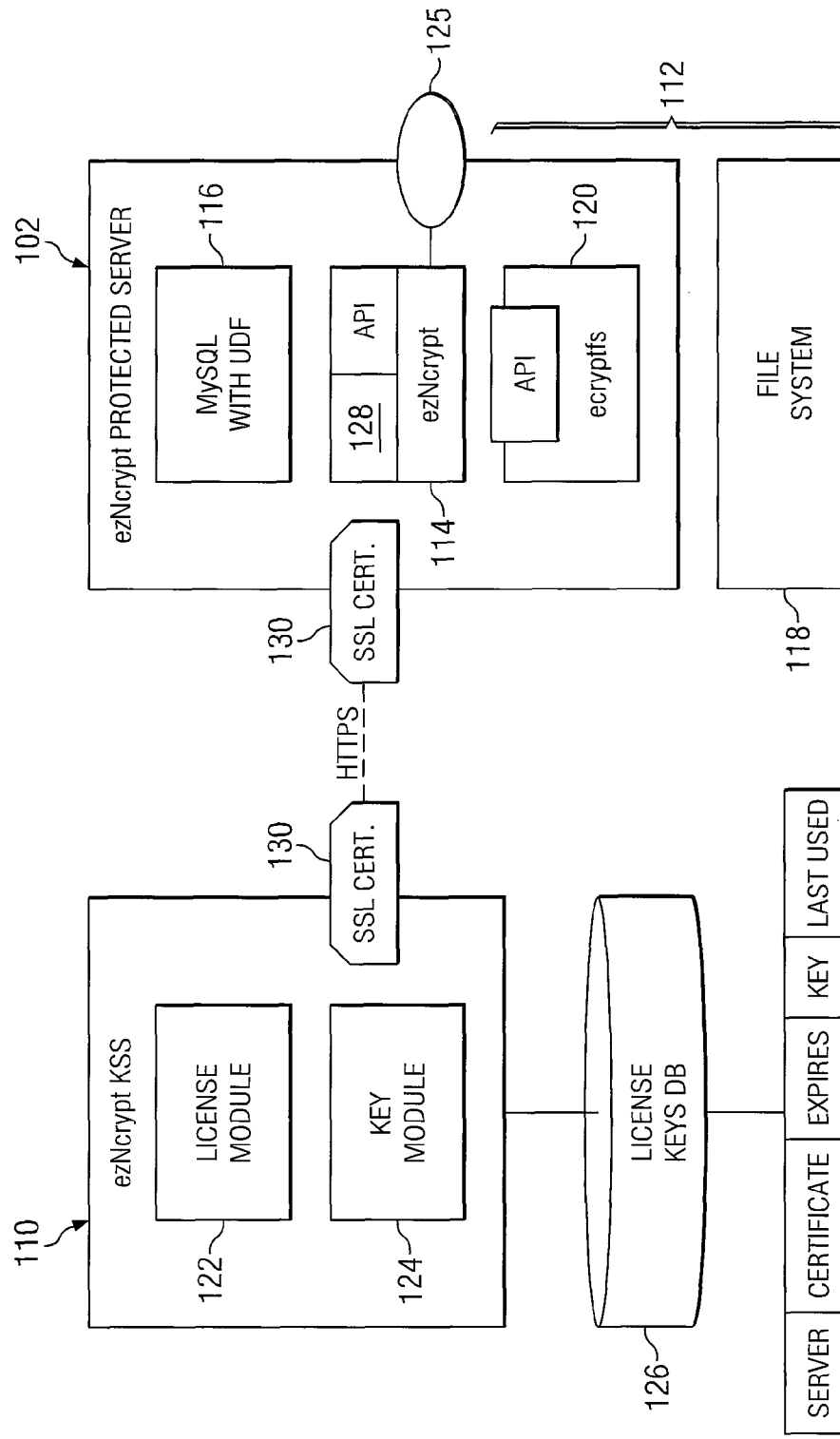
FIG. 2 is a diagram illustrating a key server and protected server in accordance with exemplary embodiments.

Embodiments and various features and advantageous details thereof are explained more fully with reference to the exemplary, and therefore non-limiting, examples illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments of the disclosure, examples of which are illustrated in the accompanying drawings. Wherever possible, like numerals will be used throughout the drawings to refer to like and corresponding parts (elements) of the various drawings.

FIG. 1 is a diagrammatic representation of one embodiment of a digital information system 100 providing encryption of data for network applications, including cloud-based applications. System 100 can include multiple servers 102 providing network based applications and multiple client computers 104 accessing the networked based applications over a network 101, such as the Internet. Servers 102 can provide an encrypted file system such that data stored by servers 102 is protected. System 100 can further include a key storage system (KSS) 110 that stores information needed to decrypt data in an encrypted file system.

FIG. 2 is a block diagram representing one embodiment of software components of a server 102 and KSS 110. Server 102 can provide an encrypted file system 112, an encrypted file system interface module 114 (labeled ezNcrypt) and one or more applications 116. In the example illustrated, the application 116 can be a MySQL database server that provides a database for other applications (e.g., web applications running on server 102 or elsewhere, SAP applications or any other applications that can be provided on one or more servers or other computing devices). In the embodiment shown, encrypted file system 112 can be stacked file system. In this example, encrypted file system 112 has an underlying file system 118 (e.g., Linux ext 2/3/4, NFS, CIFS, XFS, ReiserFS, JFS, FAT3 or other file system) and the ecryptfs file system 120. It should be noted, however, that the foregoing is simply one example of an encrypted file system, and other suitable file systems may be used.

Key storage system (KSS) 110 includes a license module 122 and key management module 124. Key storage system 110 stores decryption keys or information necessary to generate the keys in a database 126.

Encrypted file system interface module 114 can be implemented as a thin-client between applications and encrypted file system 112. Encrypted file system module 114 can present a virtual file system (VFS) 128 to applications 116. This can be the virtual file system provided by the encrypted file system 112 (e.g., the ecryptfs VFS) or a virtual file system maintained by file system interface module 114 that maps to the encrypted file system. Encrypted file system interface module 114 can receive operations from applications 116 to read/write data. Encrypted file system interface module 114 interacts with the API of encrypted file system 112 to cause the data to be encrypted/decrypted. This can be done transparently to applications 116. That is, encrypted file system interface module 114 can provide transparent data encryption (TDE) such that the applications 116 are unaware of the encryption/decryption.

According to one embodiment, encrypted file system interface module 114 can maintain a key ring 125 of encryption keys or information needed to generate encryption keys. The key ring may also contain information regarding which processes can use keys in key ring 125 (either as a whole or on an individual key basis). The key ring 125 can be initialized at kernel level when the encrypted file system interface module 114 is loaded. In order to read encrypted data from encrypted file system 112, encrypted file system interface module 114 must have either the proper decryption key or information to generate the decryption key.

In some cases, the information for key ring 125 or used to generate keys for key ring 125 may be stored at KSS 110 and retrieved by encrypted file system interface module 114. As will be described in greater detail below, for information stored at KSS 110, KSS 110 and the encrypted file system interface module 114 can undergo a secure authentication process to ensure that encrypted file system interface module 114 is authorized to retrieve the information from KSS 110 and that the information is secure during transmission.

If server 102 and key KSS 110 are connected via the Internet or other relatively unsecure network, server 102 and KSS 110 can use an encrypted protocol for transmissions. By way of example, but not limitation, encrypted file system interface module 114 can communicate with key management module 124 using https. Server 102 and KSS 110 can utilize SSL certificates (e.g., indicated at 130) to help ensure secure communication. The SSL certificates can be managed by license module 122. In addition, server 102 and key storage system 110 can implement an authentication and response protocol to ensure keys or the information necessary to generate keys are only sent to authorized servers.

As will be discussed in greater detail below, in some embodiments, the authentication process is based upon encrypted request messages sent to the KSS 110. Such requests include the information shown in FIG. 3A. In particular, a request 300 according to one embodiment can include a seed block 302, a message block 304, and an encryption encapsulation block 306.

The seed block 302 may contain one or more seeds and can be used to prevent spoofing of messages based on, for example, packet sniffing. Seeds are alternatingly transported back and forth between the KSS 110 and the encrypted file system module 114. According to one embodiment, the initial seed can be generated and distributed as discussed below, or the encrypted file system module 114 can be configured to generate a seed. In any event, encrypted file system module 114 can include a seed in communication with the KSS 110.

As will be discussed in greater detail below, the seeds can be encrypted using a single use passphrase or random key. The single use passphrase can be generated based on any number of factors including a customer name, connection information, or other factors. Any mechanism for generating single use passphrases known or developed in the art can be used. Both KSS 110 and encrypted file system interface module 114 can be configured to generate single use passphrases/keys based on the specified factors.

The message block 306 is created by the encrypted file system interface module 114 and typically includes the substance of the request and a message hash. Encrypted file system interface 114 can encrypt the message block with a passphrase or key (e.g., a symmetric passphrase or other passphrase, which can be the same as or different than the single use passphrase/key used to encrypt the seeds in seed block 302).

The encryption encapsulation block 306 includes the information needed to decrypt the seeds block 302 and/or the message block 304. In particular, the encrypted file system interface module 114 encrypts the information needed to decrypt the seed block 302 and message block 304 in encryption encapsulation block 306. As one example, encryption encapsulation block 306 can contain a 128 bit string that contains a single use symmetric passphrase to decrypt the seed and/or message block. In one embodiment, encrypted file system interface module 114 encrypts this string in the encryption encapsulation block 306 using a public key.

When the request is validated, KSS 110 generates a response 320 (FIG. 3B). This response 320 can include, for example, information necessary for encrypted file system module 114 to retrieve data from encrypted file system 112. In particular, the response 320 may have two blocks. The first block 322, in one embodiment, is an 8 bit datagram that describes the response as an error or as an encrypted response. The second block 324 contains a message with information responsive to the request. As will be described in greater detail below, the message body 322 can be encrypted with the passphrase provided in the encryption encapsulation block of the request and the private key of KSS 110 corresponding to the public key available to encrypted file system interface module 114.

Figure 3C:
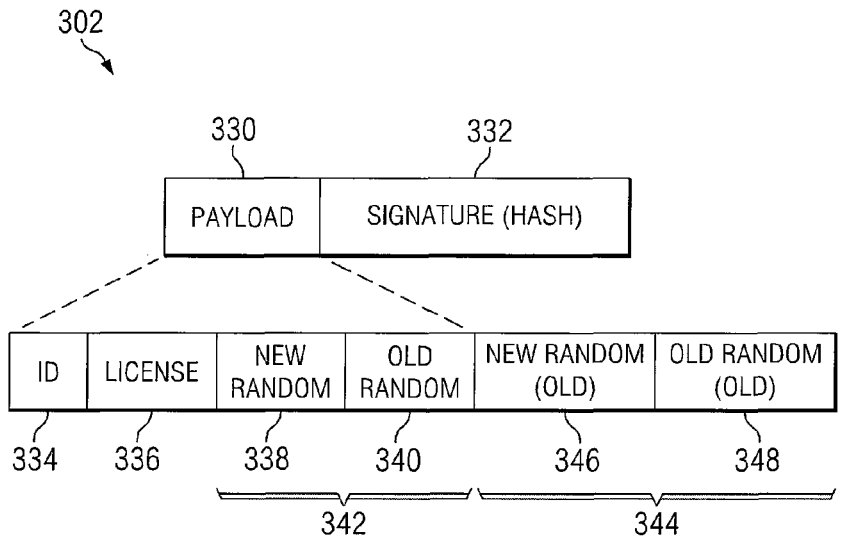

As noted above, seeds are alternatingly transferred between the KSS 110 and the encrypted file system module 114. As shown in FIG. 3C, a seed block 302 may include a payload 330 and a signature (hash) 332. The hash is used to ensure that the seed was not modified by a third party. According to one embodiment, the hash can be a SHA1 or MD5 hash string of payload 330 or a portion of payload 330.

The payload 330 may include an ID 334, a license 336, and one or more seeds. In the example illustrated, the seed block contains a new seed 342 and an old seed 344. The new seed 342 may include new and old random numbers 338, 340, while the old seed 344 includes new and old random numbers 346, 348. The ID 334 is a user machine identification sent during license activation. The license 336 is the encryption interface license number sent during license activation. The new and old random numbers 338, 340, 344, 346, according to one embodiment, are 42 character random numbers generated by the KSS 110, as will be explained in greater detail below.

Figure 4:
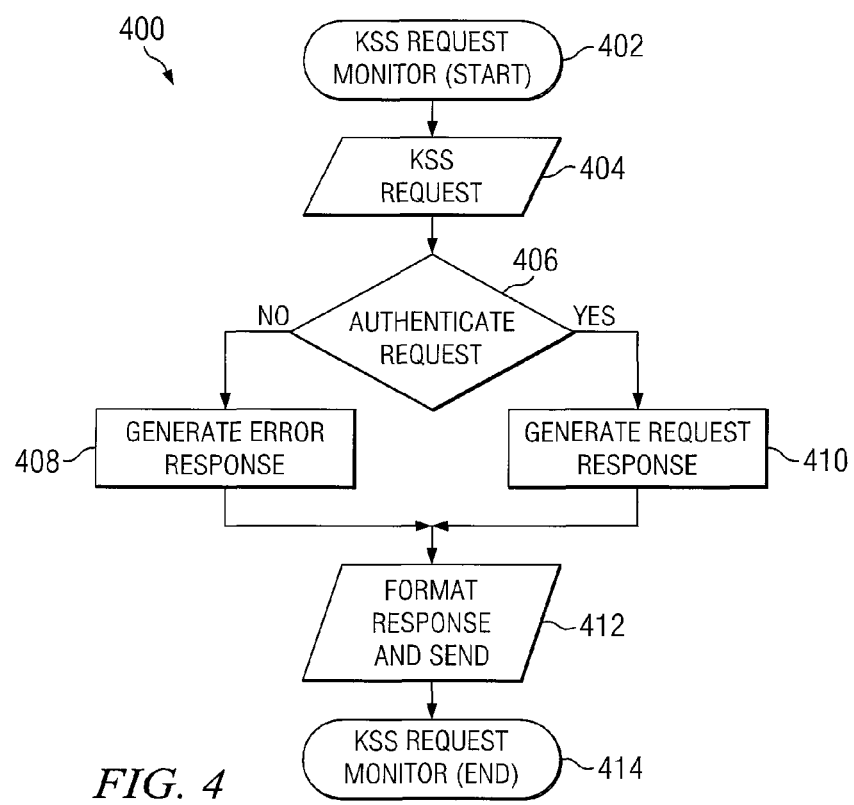
FIG. 4 is a flowchart illustrating operation of an exemplary embodiment.

FIG. 4 is a flow chart illustrating an overview of one embodiment of an authentication and response protocol. In a step 402, a KSS request 300 can be received at the KSS 110. If the KSS 110 is able to authenticate the request (as will be described in greater detail below)(step 404), then it can generate a request response 320 (step 408). If it cannot authenticate the request (step 404), then it will generate an error response (step 406). In either case, the response 320 is formatted and sent (step 410).

Figure 5:
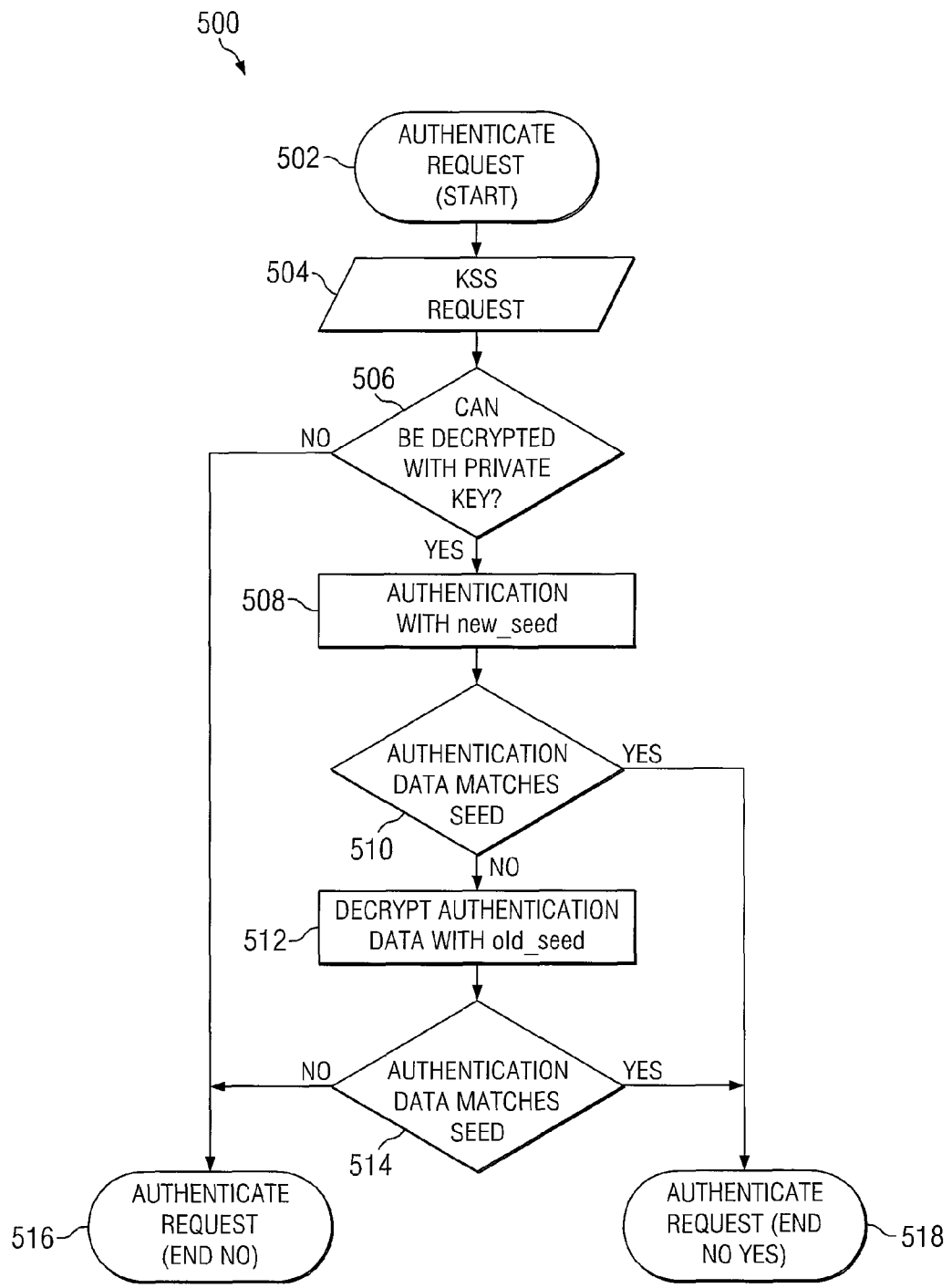
FIG. 5 is a flowchart illustrating operation of an exemplary embodiment.

FIG. 5 is a flowchart 500 illustrating one embodiment of a method for authenticating a request from a server. When KSS 110 receives a request in a process step 502, KSS 110 attempts to decrypt encryption encapsulation block 306 with the corresponding private key, in a process step 504. If this decryption is unsuccessful, KSS 110 generates an error in process step 506.

If decryption is successful (step 508), KSS 110 decrypts the message block 504 using the passphrase obtained in the encryption encapsulation block 506 to retrieve the message and message hash. KSS 110 also decrypts a seed block 302 and validates the seed against an expected "new" seed (e.g., a new seed)(step 508). Additionally, KSS 110 can generate a message hash and compare the generated hash against the hash received in the message block 304. If the seed and hashes match (step 510), the message is authenticated (step 516). If the new seed does not match, KSS 110 can decrypt an old seed (step 512). If the old seed matches the expected old seed and the hashes match (step 514), the message can be authenticated (step 516). In the response, KSS 110 can send a new seed to the encrypted file system module 114. The new seed sent by the KSS 110 will now become the new seed expected by KSS 110. If the hashes do not match or neither the old nor new seed in the request match the seed expected by KSS 110, KSS 110 can generate an error (step 506).

Using the foregoing authentication procedure, the KSS 110 will reject a request if the message 304 cannot be decrypted, the seed(s) 302 cannot be decrypted, the connection or customer data does not match, the hashes do not match, or seeds are not correct. Thus, the authentication protocol provides a high level of security for communications over untrusted networks.

Figure 6A:
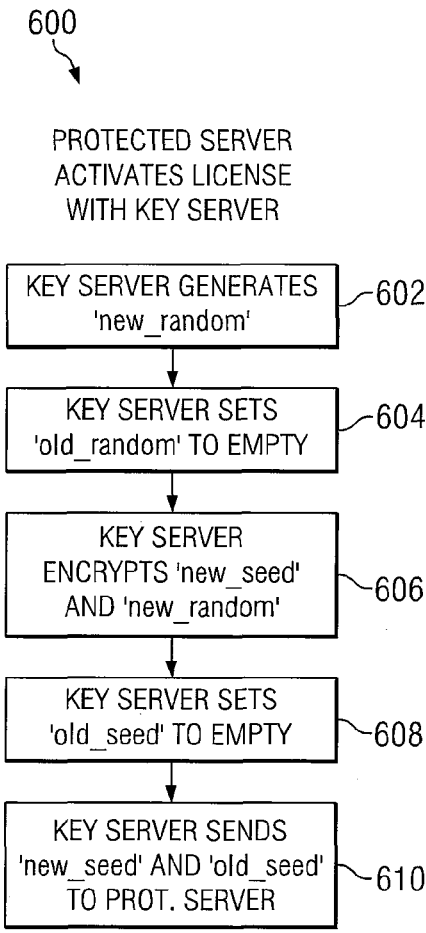
FIG. 6A and FIG. 6B are flowcharts illustrating operation of seed generation and rotation in accordance with exemplary embodiments.
Figure 6B:
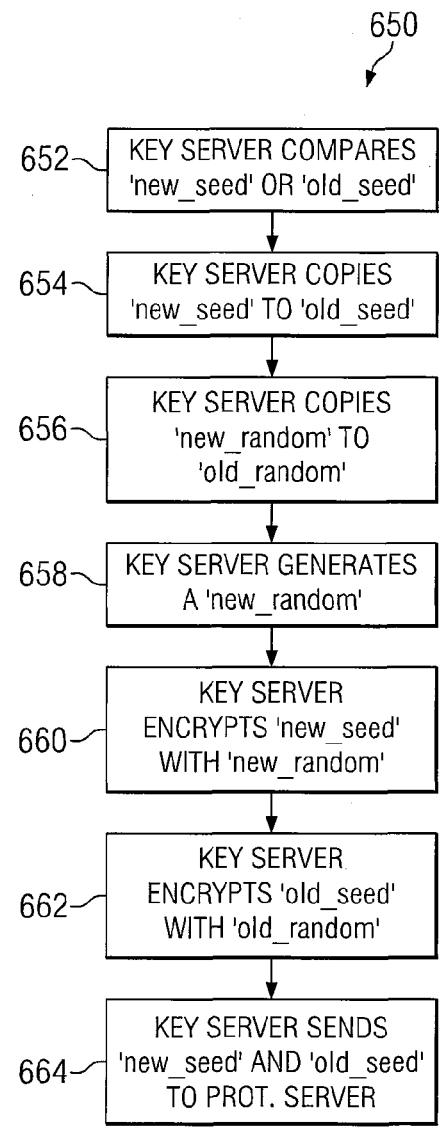

One embodiment of seed handling is discussed in greater detail with reference to FIG. 6A and FIG. 6B. In particular, FIG. 6A illustrates handling when a license is activated with the KSS 110, while FIG. 6B illustrates actions responsive to an encryption interface request. According to one embodiment, the first seed for a particular encryption interface module 114 can be generated when the encryption interface module first activates with KSS 110.

According to one embodiment, the first seed for a particular encryption interface module 114 can be generated when the encryption interface module first activates with KSS 110. Turning now to FIG. 6A, upon activation of a license with the KSS 110 the KSS 110 can create the initial new seed. Accordingly, KSS can generate a new random number, (new random number 338) (FIG. 3C) (step 602) and sets the old random number$_i$ 340 to "empty" (step 604). KSS 110 encrypts the seed block 302 as the "new seed" having the "new random" number, as new random number 338 and an empty old random number 340 (step 606). In a process step 608, the KSS 110 sets the old seed to "empty" (e.g., sets the "new random" number$_{i-1}$ 346 and old random number$_{i-1}$ 348 to empty). Using the simplified example of a single digit random number, an example set of random numbers encrypted in the old and new seeds is set forth below for the case of i=1 (e.g., when the encrypted file system interface module is activated):

a. New seed$_i$:
 i. "new random" number$_i$=3
 ii. "old random" number$_i$=0
b. Old seed$_i$:
 i. "new random" number$_{i-1}$=0
 ii. "old random" number$_{i-1}$=0

Finally, in a process step 610, the KSS 110 sends the new seed and the old seed to the encryption interface 114.

A subsequent request from the encrypted file system interface module 114 should include at least one of the new seed or old seed. When a valid request is received, KSS can update the seeds. FIG. 6B illustrates seed alternation operation when the KSS 110 receives a request from the encryption interface 114. At a process step 652, the KSS 110 will decrypt the seed block and compare the new seed or old seed received in the request with the expected new seed or old seed (as discussed above). For example, the KSS can decrypt a seed block 302 and compare the license, ID and new random numbern and old random number$_n$ to an expected combination of license, ID and "new random" numbers.

In response to the request the KSS may rotate the seeds. According to one embodiment KSS 110 can set the old seed to be equal to the previous new seed (e.g., set "old random" number (step 654). In one example, "old random" number$_i$ 340 is set to the previous "new random" number$_{i-1}$ 338 (step 656). The KSS may then generate a "new random" number$_i$ 338 (step 658). The KSS 110 may then encrypt the "new random" number$_i$ and "old random" number$_i$ as part of the "new" seed (step 660). In process step 662, the KSS sets the old seedi to the values of the new seed$_{i-1}$. Finally, in a process step 664, the KSS will send the new seed and the old seed to the encrypted file system interface module 114.

Returning to the previous example using a single digit random number, an example new seed$_i$ and old seed$_i$ are illustrated:

a. New seed$_i$:
 i. "new random" number$_i$=2
 ii. "old random" number$_i$=3
b. Old seed$_i$:
 i. "new random" number$_{i-1}$=3
 ii. "old random" number$_{i-1}$=0

The process of rotating seeds can continue each time KSS 110 receives a request from the particular encrypted file system interface module. To continue with the previous example, an example new seed and old seed are illustrated for a third iteration:

a. New seed$_i$:
 i. "new random" number$_i$=9
 ii. "old random" number$_i$=2
b. Old seed$_i$:
 i. "new random" number$_{i-1}$=2
 ii. "old random" number$_{i-1}$=3

It should be noted that the use of the old seed accounts for the case in which the KSS receives a request, but communication is lost before the KSS can send a new seed back to the encrypted file system interface module. In such a case, the encrypted file system interface module 114 may still authenticate with the last seed it received. In other embodiments, the old seed may not be used or considered. In still other embodiments, the KSS may allow an encrypted file system module 114 to authenticate using any number of generations of old seeds.

Seeds can be rotated at each communication, request or other event. This minimizes the likelihood that an unauthorized user who discovered a seed in one communication (e.g., by packet sniffing and breaking decryption) will be able to authenticate with KSS 110 as the proper seeds will have changed by the time the unauthorized user discovers the seeds. It can be further noted that the KSS 110 may generate different seeds for each activated encrypted file system interface module 114. Thus, even if the proper seed values are somehow discovered for one encrypted file system interface module 114, other file system interface modules 114 will not be compromised.

Figure 7:
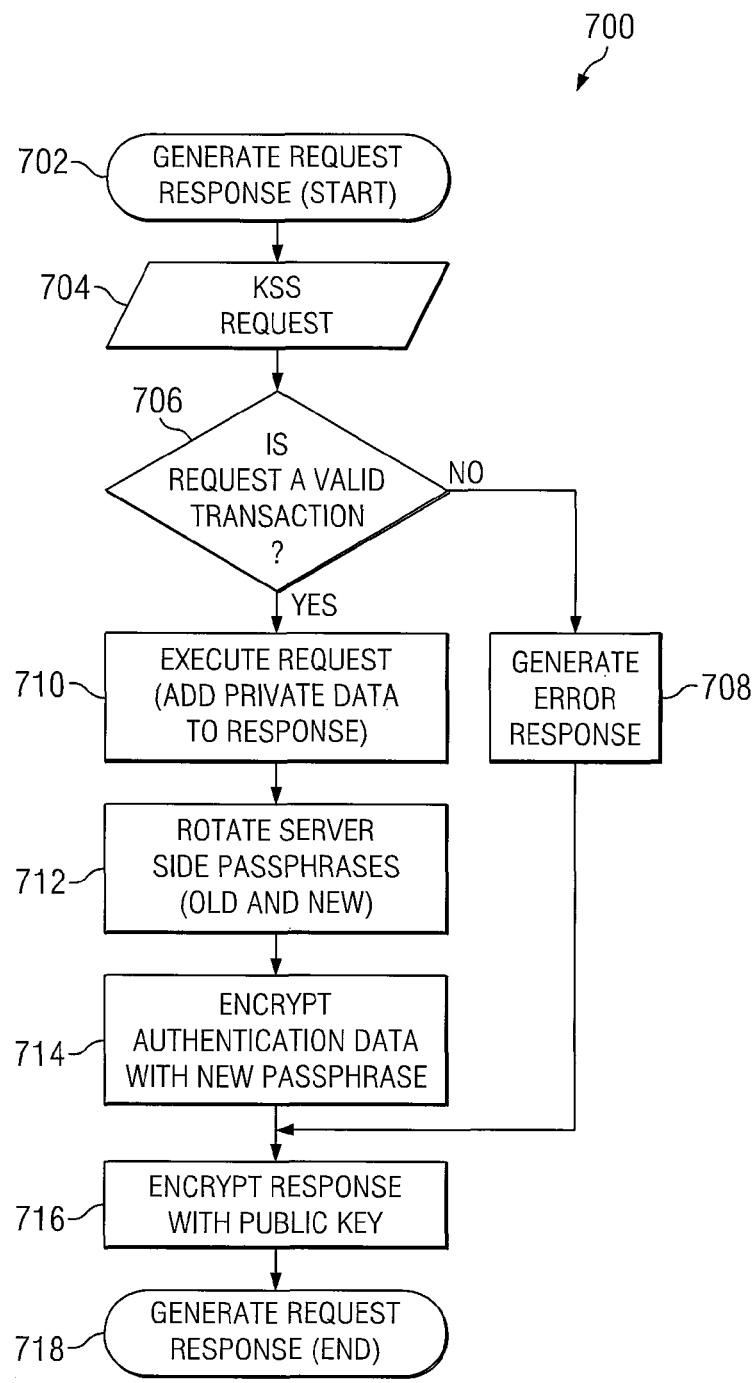
FIG. 7 is a flowchart illustrating operation of an exemplary embodiment.

FIG. 7 is a flow diagram illustrating one embodiment for generating a response 320. Once KSS 110 authenticates the request (step 702), KSS 110 validates the message portion of the request against a catalog of transactions that can be performed by encrypted file system interface module 114 (step 704). The transactions available may depend on the location of encrypted file system interface module 114, the entity running encrypted file system interface module 114 or other factors. Exemplary transactions can include requests to validate a license, change a key, check a license, etc. Thus, different transactions may be available to different installations of encrypted file system interface module 114.

Once the request is determined to be a valid transaction (step 708), the request is executed. That is, data is added to the message block 324 for transmission. This can include, for example, a new passphrase and salt, or other messages responsive to the request from the KSS 110. The KSS 110 may then rotate the seeds or passphrases, between the old and new ones (step 710). That is, the seed it received from the server is now the old seed and KSS 110 generates a new seed.

In a step 712, the seed(s) are encrypted using the random key or passphrase. Finally (step 714), the response and/or passphrase random key is encrypted using the public key.

Thus, according to one embodiment, authentication data is sent on every communication. This data is signed with a secondary set of keys and encrypted with a single use symmetric passphrase generated at the service provider's end. This format allows checking the authenticity of the information source as well as integrity of the information. The solution warranties that the information sent form the server to the client are secret and untouched from a third party. This mechanism allows KSS 110 to trust that the machines that send and receive information and vice versa. Thus, KSS 110 can provide secure off-site key management.

It should be noted that each stage of encryption/decryption can be performed using the same or different encryption algorithms. Examples of such algorithms include, but are not limited to, RSA, AES, DEA, DES, Triple DES, Blowfish, Threefish, TEA or other encryption/decryption algorithms known or developed in the art.

Returning to FIG. 2, encrypted file system interface module 114 can be implemented to provide an encrypted file system for a variety of applications. According to one embodiment, encrypted file system interface module 114 can be implemented on a MySQL server (MySQL is an open source database available from Oracle Corporation, Redwood Shores, Calif.).

Figure 8:
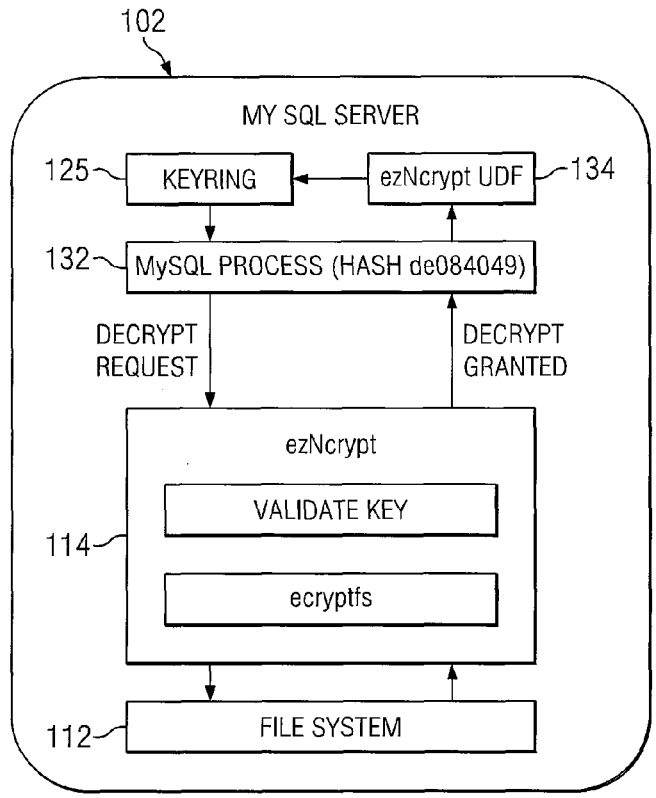
FIG. 8 is a diagram of an SQL server in accordance with exemplary embodiments.

FIG. 8 is a block diagram of one embodiment of components of a MySQL server 102 and interactions between the components. Server 102 can include encrypted file system 112, encrypted file system interface module 114 and a MySQL process 132. When MySQL process 132 makes a request for data, encrypted file system interface module 114 requests the data from encrypted file system 112. Encrypted file system 112 verifies the encrypted file system interface module 114 has the correct key loaded in key ring 125. If so, encrypted file system 112 can decrypt the requested data. Consequently, in order to provide access to decrypted data to the MySQL process 132, the MySQL process 132 must ensure that the correct key is loaded into key ring 125. The key itself may be obtained from the KSS 110 using the techniques described above.

While MySQL does not provide a mechanism by which processes can load keys into a key ring, MySQL does allow for User Defined Functions (UDFs). A UDF 134 can be created that is executed on startup of the MySQL Process to load the proper key in key ring 125. That is, the UDF may be configured to cause encrypted file system interface module 114 to request information from KSS 110 according to the authentication/response protocol discussed above.

If needed, encrypted file system interface module 114 can pass information to encrypted file system 112 to cause generation of the appropriate key. Further, encrypted file system module 114 can load a key received from KSS 110 or generated based on information from KSS 110 in the key in key ring 125 in a manner that indicates the key was loaded on behalf of MySQL process 132. According to one embodiment, for example, UDF 134 can pass a hash code for MySQL process 132 to encrypted file system interface module 114. This hash code can be stored in key ring 125 when the appropriate key is loaded. Encrypted file system interface module 114 can load the key and other information in key ring 125 using the ecryptfs API 120 (FIG. 2), which allows data to be passed from user space into kernel space.

Figure 9:
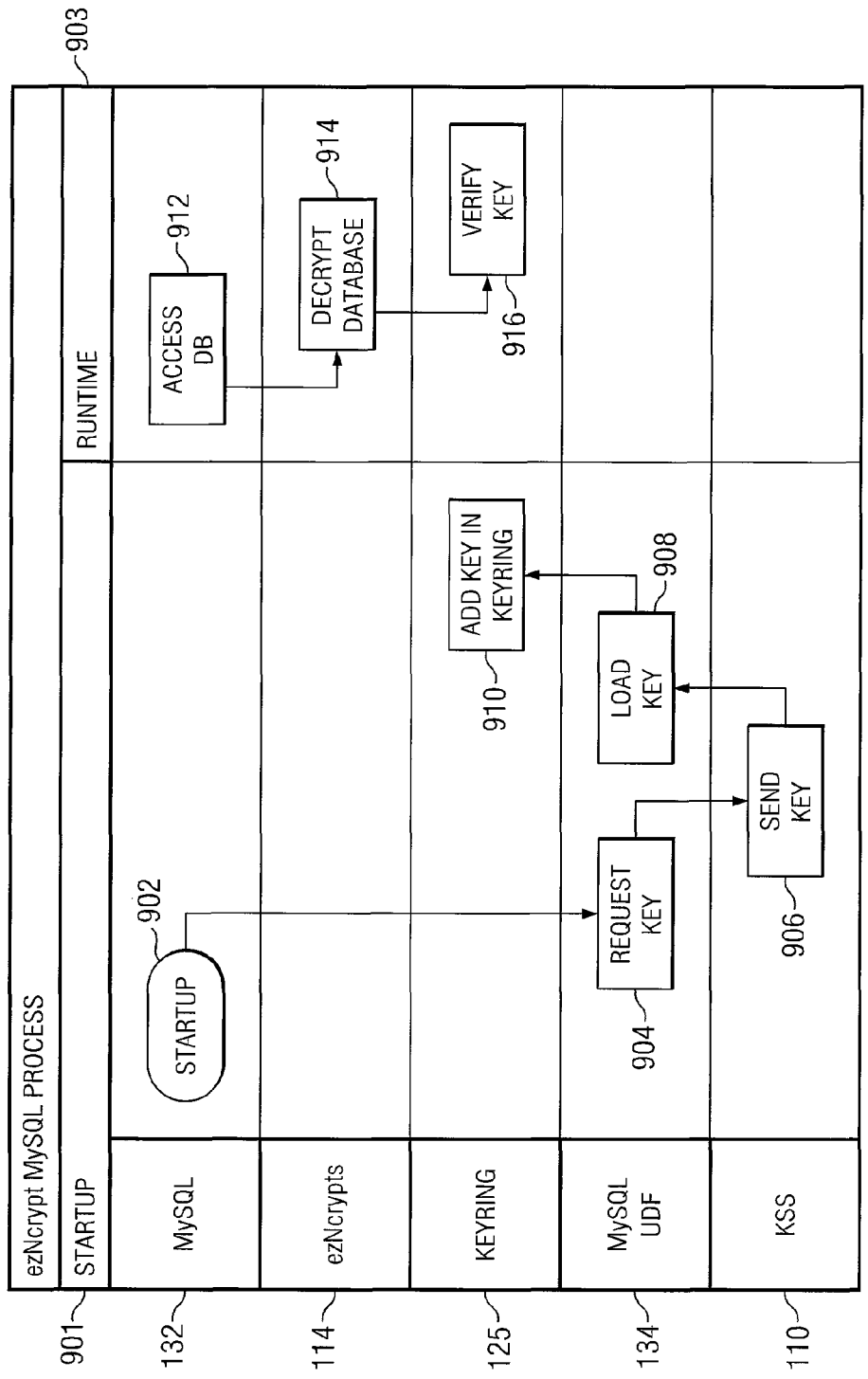
FIG. 9 is a diagram schematically illustrating an encrypt process in accordance with exemplary embodiments.

FIG. 9 is a diagrammatic representation of one embodiment of the MySQL process for loading a key and accessing an encrypted database. According to one embodiment, UDF 134 is programmed to interact with the API of encrypted file system interface module 114. UDF 134 can cause encrypted file system interface module 114 to request a key at 904 from KSS 110 using the authentication protocol discussed above. According to one embodiment, KSS 110 will provide the authentication information necessary to generate the appropriate keys at 906. Encrypted file system interface module 114 passes the authentication information to encrypted file system 112 (e.g., using the ecrtyptfs API) to cause encrypted file system 112 to generate the proper key at 908. The UDF further causes the encrypted file system interface module 114 to store the key in keyring 125 along with information indicating that the key was loaded by MySQL process 132 at 910. For example, the key can be stored with SHA256 hash of a process file or other information in key ring 125.

When the MySQL process 132 sends a request to access the database stored in encrypted file system 112 at 912, encrypted file system interface module 114 will send a request to decrypt the appropriate files to encrypted file system 112 at 914. Encrypted file system 112 will verify the key is in key ring 125 at 816. If the proper key is in key ring 125, the database will be decrypted and access provided to encrypted file system interface module 114.

Encrypted file system interface module 114 further verifies that the key was loaded by the MySQL process 134 based on the information in key ring 125 before providing the decrypted data to MySQL process 134. For example, this can include comparing a process ID, SHA256 hash, process name or other information in key ring 125. For example, encrypted file system interface module 114 can generate a hash for the process requesting data and compare the hash to the hash in key ring 125. In another embodiment, encrypted file system interface module 114 may simply check if a hash (or other information) is stored in key ring 125 before granting access assuming that other processes or users would not know to store the information in key ring 125 when loading a key. If the key is loaded into key ring 125 in another manner (e.g., not by the UDF), the appropriate information will be missing from key ring 125. Consequently, encrypted file system interface module 114 can prevent access to data even if the encrypted file system 112 can decrypt the data with the key in key ring 125.

The authentication process provides protection against users or processes that may have discovered the proper key. For example, if a "root" user loads the proper key into key ring 125, encrypted file system 112 will still be able to decrypt the data using the key. However, because the key was not loaded by MySQL process 132, key ring 125 will lack the appropriate information. Accordingly, encrypted file system interface module 114 can prevent access by the root user to the data.

Figure 10:
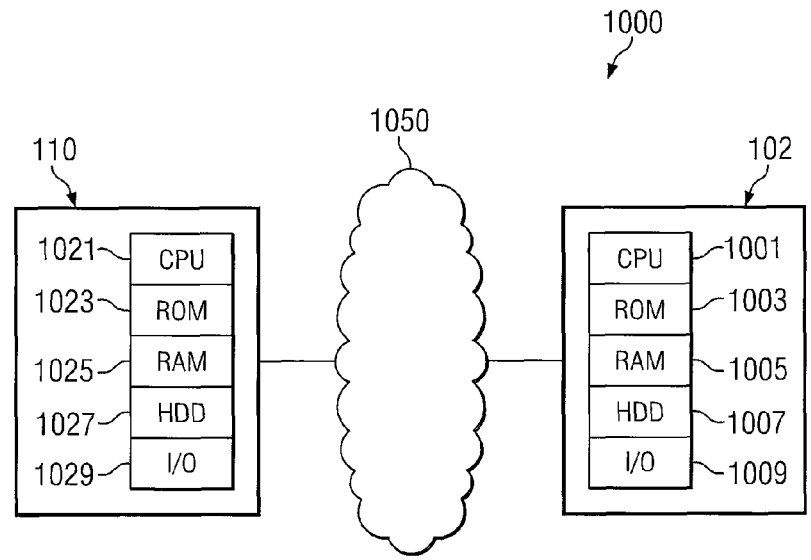
FIG. 10 is a diagram illustrating a system in accordance with exemplary embodiments.

FIG. 10 depicts a simplified network architecture for an example computing environment where embodiments disclosed herein may be implemented. As one skilled in the art can appreciate, the exemplary architecture shown and described herein with respect to FIG. 10 is meant to be illustrative and not limiting. In FIG. 10, computing environment 1000 may comprise network 1050. In the simplified configuration shown in FIG. 10, network 1050 is bi-directionally coupled to a plurality of computers and/or machines. Server 102 and KSS 110 can comprise virtually any piece of hardware or electronic device capable of running software and communicating over a network. As an example, server 102 may include a central processing unit (CPU) 1001, read-only memory (ROM) 1003, random access memory (RAM) 1005, hard drive (HD) or non-volatile memory 1007, and input/output (I/O) device(s) 1009. An I/O device may be a keyboard, monitor, printer, electronic pointing device (e.g., mouse, trackball, etc.), network interface device or the like. The hardware configuration of computer 102 can be representative to other devices and computers alike coupled to network 1050. KSS 110 can similarly include a central processing unit (CPU) 1021, read-only memory (ROM) 1023, random access memory (RAM) 1025, hard drive (HD) or non-volatile memory 1027, and input/output (I/O) device(s) 1029. KSS 110 can maintain a database 126 used to store keys and certificate information.

Server 102 and/or KSS 110 can be a cloud implemented servers. In this context, a "cloud" is a scalable computer system or network that can be provisioned to create or mimic a desired hardware or software environment. Examples of clouds include, but are not limited to, Amazon Web Services° Elastic Compute Cloud ("EC2"), Vmware vCloud, Rackspace managed clouds, and other publicly available clouds.

Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers. The various modules describe above may be implemented as portions of the same program, different stand alone programs, portions of larger programs, plug-ins, or according to other suitable programming architecture.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure.

What is claimed is:

1. A method for providing authenticated access, comprising:
   sending an encrypted message over a network from a computer having an encrypted file system to a key server, the encrypted message comprising:
   a new seed;
   an old seed;
   a message block containing a request for encryption data used to decrypt data in the encrypted file system; and
   an encryption encapsulation block including information for decrypting the message block, wherein the new seed, old seed, message block and encryption encapsulation block are encrypted;
   at the key server:
   receiving the encrypted message;
   determining if the encrypted message can be decrypted using an encryption key;
   rejecting the request in response to determining that the encrypted message cannot be decrypted using the encryption key;
   performing further authentication in response to decrypting the encrypted message, wherein performing further authentication comprises:
   comparing the new seed to a set of authentication data;
   comparing the old seed to the set of authentication data in response to the new seed not matching the set of authentication data;
   rejecting the request in response to neither the new seed nor the old seed matching the authentication data; and
   determining that the request is authenticated in response to either the old seed or new seed matching the authentication data;
   determining if the request is authorized in response to determining that the request is authenticated; and
   returning the encryption data to the computer in response to determining that the request is authorized.

2. The method of claim 1, wherein determining if the request is authorized further comprises validating the request against a catalog of transactions that can be performed by the computer.

3. The method of claim 1, wherein the new seed and old seed are encrypted in a seed block using a first type of encryption, the message block is encrypted using a second type of encryption and the encryption encapsulation block is encrypted using a third type of decryption.

4. The method of claim 1, further comprising:
   generating a message hash at the key server;
   comparing the generated message hash to a received message hash included in the message block; and
   rejecting the request in response to the generated message hash and received message hash not matching.

5. The method of claim 1, further comprising:
   at the computer, using the encryption data to generate a file system encryption key; and
   storing the file system encryption key in a key ring for the encrypted file system.

6. The method of claim 1, further comprising storing the encryption data in a key ring for the encrypted file system.

7. A system comprising:
   a first server computer operably coupled to a network, the first server including an encrypted file system;
   a key server computer operatively coupled to the network, the key server computer comprising a processor and a non-transitory computer readable medium storing a set of computer executable instructions that, when executed by a processor, cause the processor to perform a method comprising:
   receiving an encrypted message from the first server, the encrypted message comprising:
   a new seed;
   an old seed;
   a message block containing a request for encryption data used to decrypt data in the encrypted file system; and
   an encryption encapsulation block including information for decrypting the message block, wherein the new seed, old seed, message block and encryption encapsulation block are encrypted and wherein the old seed is a seed that was contained in a previous message to the key server;
   determining if the encrypted message can be decrypted using an encryption key;
   rejecting the request in response to determining that the encrypted message cannot be decrypted using the encryption key;
   performing further authentication in response to decrypting the encrypted message, wherein performing further authentication comprises:
   comparing the new seed to a set of authentication data;
   comparing the old seed to the set of authentication data in response to the new seed not matching the set of authentication data;
   rejecting the request in response to neither the new seed nor the old seed matching the authentication data; and
   determining that the request is authenticated in response to either the old seed or new seed matching the authentication data;
   determining if the request is authorized in response to determining that the request is authenticated; and
   returning the encryption data to the first server in response to determining that the request is authorized.

8. The system of claim 7, wherein determining if the request is authorized further comprises validating the request against a catalog of transactions that can be performed by the first server.

9. The system of claim 7, wherein the new seed and old seed are encrypted in a seed block using a first type of encryption, the message block is encrypted using a second type of encryption and the encryption encapsulation block is encrypted using a third type of decryption.

10. The system of claim 7, wherein:
    the first server computer is configured to include a first message hash in the message block such that the message hash is received by the key server; and the key server computer is further configured to:
  generate a second message hash;
  compare the generated second message hash to the first message hash received in the message block; and
  rejecting the request in response to the generated message hash and the first message hash not matching.

11. The system of claim 7, wherein is the first server is further configured to maintain a key ring for the encrypted file system, the key ring storing information received from the key server.

12. The system of claim 7, wherein the new seed, old seed and message block are encrypted using a bit string, the bit string encrypted in the encryption encapsulation block using a public key of the key server.

13. The system of claim 7, wherein the new seed and old seed are encrypted using a first bit string and the message block is encrypted using a second bit string, the second bit string encrypted in the encryption encapsulation block using a public key of the key server.

14. The system of claim 13, wherein the first bit string comprises a first single use passphrase and the second bit string comprises a second single use passphrase.

15. The system of claim 7, wherein the first server is configured to include a new seed and an old seed in messages to the key server.

16. A computer program product comprising a non-transitory computer readable medium storing a set of computer instructions that, when executed by a processor, cause the processor to perform a method comprising:
  maintain a store of encryption data for authorized computers;
  receiving an encrypted message from a first computer, the encrypted message comprising:
    a new seed;
    an old seed;
    a message block containing a request for encryption data used to decrypt data in an encrypted file system; and
    an encryption encapsulation block including information for decrypting the message block, wherein the new seed, old seed, message block and encryption encapsulation block are encrypted and wherein the old seed is a seed that was contained in a previous message from the computer;
  determining if the encrypted message can be decrypted using an encryption key;
  rejecting the request in response to determining that the encrypted message cannot be decrypted using the encryption key;
  performing further authentication in response to decrypting the encrypted message, wherein performing further authentication comprises:
    comparing the new seed to a set of authentication data;
    comparing the old seed to the set of authentication data in response to the new seed not matching the set of authentication data;
    rejecting the request in response to neither the new seed nor the old seed matching the authentication data; and
    determining that the request is authenticated in response to either the old seed or new seed matching the authentication data;
  determining if the request is authorized in response to determining that the request is authenticated; and
  returning the encryption data to the first computer in response to determining that the request is authorized.

17. The computer program product of claim 16, wherein determining if the request is authorized further comprises validating the request against a catalog of transactions that can be performed by the computer.

18. The computer program product of claim 16, wherein the new seed and old seed are encrypted using a first type of encryption, the message block is encrypted using a second type of encryption and the encryption encapsulation block is encrypted using a third type of decryption.

19. The computer program product of claim 16, further comprising instructions executable by the processor to:
  generate a message hash;
  compare the generated message hash to a received message hash included in the message block; and
  in response to the generated message hash and the received message hash not matching, rejecting the request.

20. The computer program product of claim 16, wherein the requested encryption data comprises a file system encryption key.

21. The computer program product of claim 16, wherein the requested encryption data comprises information used to generate a file system encryption key.

* * * * *